United States Patent [19]

Matsumoto et al.

[11] Patent Number: 4,615,963
[45] Date of Patent: Oct. 7, 1986

[54] ELECTROPHOTOGRAPHIC PHOTOSENSITIVE MEMBER AND PREPARATION OF PHOTOCONDUCTIVE COMPOSITION THEREFOR

[75] Inventors: Masakazu Matsumoto; Hideyuki Takahashi, both of Yokohama, Japan

[73] Assignee: Canon Kabushiki Kaisha, Tokyo, Japan

[21] Appl. No.: 708,781

[22] Filed: Mar. 6, 1985

[30] Foreign Application Priority Data

Mar. 10, 1984 [JP] Japan .................................. 59-44842

[51] Int. Cl.$^4$ ........................ G03G 5/04; G03G 5/05
[52] U.S. Cl. ..................................... 430/56; 430/135; 34/5
[58] Field of Search ..................... 430/56, 135; 34/5

[56] References Cited

U.S. PATENT DOCUMENTS

| | | | |
|---|---|---|---|
| 3,159,498 | 12/1964 | Davis et al. | 34/5 X |
| 3,730,750 | 5/1973 | Fabian | 34/5 X |
| 3,731,391 | 5/1973 | Schweizer | 34/5 |
| 3,942,261 | 3/1976 | Hirata et al. | 34/5 |

*Primary Examiner*—Roland E. Martin
*Attorney, Agent, or Firm*—Fitzpatrick, Cella, Harper & Scinto

[57] ABSTRACT

An electrophotographic photosensitive member is provided which comprises a photosensitive layer containing a photoconductive pigment or dye dried according to freezing vacuum drying dispersed in a binder resin.

14 Claims, No Drawings

ELECTROPHOTOGRAPHIC PHOTOSENSITIVE MEMBER AND PREPARATION OF PHOTOCONDUCTIVE COMPOSITION THEREFOR

BACKGROUND OF THE INVENTION

1. Field of the Invention

This invention relates to a method for preparing a photoconductive composition containing a microparticulate pigment or dye, more particularly to an electrophotographic photosensitive member which can improve electrophotographic characteristics and to a method for preparing an organic photoconductive composition.

2. Description of the Prior Art

In the prior art, as the electrophotographic photosensitive member comprising an inorganic photoconductive material, there have widely been used those employing selenium, cadmium sulfide, zinc oxide, etc.

On the other hand, as the electrophotographic photosensitive member comprising an organic photoconductive material, there have been known those employing photoconductive polymers, typically poly-N-vinylcarbazole, or low molecular weight organic photoconductive materials such as 2,5-bis(p-diethylaminophenyl)-1,3,4-oxadiazole, and further combinations of such organic photoconductive materials with various kinds of dyes and pigments.

Electrophotographic photosensitive members employing organic photoconductive materials have the advantages of good film forming property, very high productivity because they can be produced by coating and low cost of the photosensitive members produced. Also, there is an additional advantage that color sensitivity can be controlled as desired by choice of the sensitizers employed such as dyes or pigments, and therefore these photosensitive members have widely been investigated. Particularly, in recent years, by development of a function separation type photosensitive member, in which a charge generation layer of an organic photosensitive pigment and a so-called charge transport layer comprising a photoconductive polymer or a low molecular weight organic photoconductive material as mentioned above are laminated, sensitivity and durability of the organic electrophotographic photosensitive member, which have been deemed to be the drawbacks in the prior art, are improved and they are becoming utilized for practical application. Further, various kinds of compounds and pigments sensitive to the function separation type photosensitive member have been found.

On the other hand, in such a function separation type photosensitive member, which is constituted of at least two layers of a charge generation layer and a charge transport layer, the charge carriers generated by light absorption by the charge generation layer are injected into the charge transport layer to have the surface charges of the photosensitive member disappeared, thereby forming an electrostatic contrast. This type of photosensitive member will be affected in its sensitivity by the particle size of the charge generating material contained in the charge generation layer, and a charge generation material with a particle size of about $1\mu$ or less, desirably $0.5\mu$ or less, is known to be preferable for sensitivity. For this reason, in the preparation method of the prior art, after purification of the pigment or dye obtained by synthesis reaction, the powdery product obtained once by drying by heating is subjected to micropulverization together with a binder to about $1\mu$ or less, desirably $0.5\mu$ or less, by means of a sand mill, ball mill or an attritor.

However, the particles obtained according to such a method of the prior art will be changed in state of the particle sizes according to the changes in temperature or humidity during the preparation steps. Particularly, when heated to a temperature of 50° C. or higher, coarse particles will be liable to be formed, and it is necessary to effect sufficiently pulverization of the dye. Practically, however, there is involved a technically difficult problem in obtaining microparticulate composition in which the number of coarse particles is sufficiently reduced by way of the pulverizing step. Besides, since the state of particles agglomerated will be changed depending on the preparation environment, it is not possible to apply micropulverization treatment under constant conditions, thus creating a difficulty in manufacturing steps. Also, since coarse particles are contained in a large amount, the photosensitivity suffers from not only lowering in number of carriers generated accompanied with lowering in shielding force, but also lowering in carrier mobility caused by increase of the void volume by the coarse particles. Further, due to great unevenness on the surface of the charge generation layer, the efficiency of carriers injected into the charge transport layer will be lowered. Thus, a large number of drawbacks in sensitivity are involved, and yet there is an additional disadvantage that the potential stability during repeated uses is lowered.

SUMMARY OF THE INVENTION

An object of the present invention is to provide a method for preparing a photoconductive composition containing microparticulate organic pigment or dye.

Another object of the present invention is to provide a method for preparing a photoconductive composition where formation of coarse particles can be sufficiently reduced.

Still another object of the present invention is to provide a method for preparing a photoconductive composition which is suitable for production of an electrophotographic photosensitive member having high sensitivity characteristics and stable potential characteristics during repeated uses.

According to one aspect of the present invention, there is provided an electrophotographic photosensitive member, comprising a photosensitive layer containing a photoconductive organic pigment or dye dried by the freeze vacuum drying method and dispersed in a binder resin.

According to another aspect of the present invention, there is provided a method for preparing a photoconductive composition, which comprises drying an organic pigment or dye obtained by synthesis reaction according to freeze vacuum drying, and thereafter dispersing and forming into a film the pigment or dye.

DESCRIPTION OF THE PREFERRED EMBODIMENTS

The freeze vacuum drying method as described in the present specification refers to the method in which a paste-like mixture, dispersion or solution containing an organic pigment or dye obtained by a synthesis reaction in water or a solvent is quenched to a pre-freezed state to a freezing-point or lower, under which state drying is performed under high vacuum of the vapor pressure of water or the solvent at the freezing-point. Since it is the drying method, wherein the state of dispersion or solution is fixed, micropulverization of a pigment or dye can be done with relative ease irrespectively of the pigment or dye to be employed obtained by the synthesis reaction.

The organic pigment or dye obtained by synthesis reaction suitably used for the present invention may include, for example, azo pigments, phthalocyanine pigments, quinacridone pigments, cyanine dyes, pyrylium dyes, thiapyrylium dyes, indigo pigments, squaric acid dyes, polycyclic quinone pigments, etc.

To describe here about an embodiment of the composition of fine particles ($1\mu$ or less, desirably $0.5\mu$ or less) of the disazo pigment of the present invention, a diamine such as 2,5-bis(p-aminophenyl)-1,3,4-oxadizaole, 3,3'-dichlorobenzidine, diaminostilbene, diaminedistilbene etc. is first subjected to tetrazotization in a conventional manner, followed by azo coupling of a coupler in the presence of an alkali, or after separating once the tetrazonium salt of the aforesaid diamine in the form of a borofluoride or zinc chloride complex, the salt is subjected to azo coupling with a coupler in the presence of an alkali in a suitable solvent, to synthesize a disazo pigment. Then, after filtration and washing with water, the pigment can be purified by washing with a solvent such as dimethylformamide (DMF), dimethylacetamide (DMAC), methanol, ethanol, isopropyl alcohol (IPA), methyl ethyl ketone (MEK), methyl isobutyl ketone (MIBK), benzene, xylene, toluene, tetrahydrofuran (THF), etc. The purified pigment is then brought to freeze vacuum drying under the state dispersed in the solvent during purification or the state of a paste. Alternatively, it may also be replaced with water or other solvents before carrying out freeze vacuum drying.

Freeze vacuum drying, in the case of a pigment containing water, can theoretically be practiced by prefreezing to 0° C. or lower and controlling the vacuum degree so that the vapor pressure of water at 0° C. may not exceed 4.5 mm Hg. However, in view of the drying speed and easiness in control, a vacuum degree of 1 mm Hg or lower is preferred. Further, in the case of organic solvents other than water, most examples have very low freezing-points and therefore very low vapor pressures at that temperatures. For this reason, high vacuum degree is generally required for freeze vacuum drying of an organic solvent and conditions therefor can be set with difficulty, but the dried product obtained is shaped in fine particles with good characteristics, thus exhibiting the effect equal to or better than that in the case of water.

The pigment power micropulverized by freeze vacuum drying is further subjected to dispersion and film formation, following the procedures as described below.

The pigment power is formed into a dispersion by adding only the pigment or together with a binder resin into various kinds of solvents, including alcohol solvents such as methanol, ethanol, IPA, etc., ketone solvents such as acetone, MEK, MIBK, cyclohexanone, etc., aromatic solvents such as benzene, toluene, xylene, chlorobenzene, etc., 1,4-dioxane, THF, DMF, DMAC, etc.

As the dispersing means, there may be employed the methods by use of sand mill, colloid mill, attritor, ball mill etc.

The binder resin may include polyvinylbutyral, formal resin, polyamide resin, polyurethane resin, polycarbonate resin, acrylic resin and others.

According to the present invention, the dried pigment is very bulky and brittle, and therefore it can readily be made into a dispersion of fine particles of $1\mu$ or less according to a simple dispersing treatment. When this is applied for an electrophotographic photosensitive member, improvement of sensitivity characteristic and charging characteristic during repeated uses can be seen, as also apparent from the Examples set forth below.

According to the present invention, for other pigments or dyes than the disazo pigment as described above, micropulverized compositions can also similarly be prepared.

Then, film formation of the dispersion obtained is described by referring to an example for preparation of an electrophotographic photosensitive member.

A charge generation layer can be formed by applying the aforesaid dispersion by way of direct coating onto an electroconductive substrate or on an adhesive layer. It can also be formed by coating on the charge transport layer as described below. The charge generation layer should desirably have a film thickness of $5\mu$ or less, preferably 0.01 to $1\mu$. This film thickness is desirable because most of the quantity of incident light is absorbed by the charge generation layer to generate a large amount of charge carriers, and further because the charge carriers generated are required to be injected into the charge transport layer without deactivation through recombination or trap.

Coating may be carried out according to various coating methods such as dip coating, spray coating, spinner coating, bead coating, Meyer bar coating, blade coating, roller coating, curtain coating, etc. Drying may be performed preferably to set to touch at room temperature and thereafter by heat drying. Heat drying can be done at a temperature of 30° C. to 200° C. for 5 minutes to 2 hours, either under stationary state or under air blasting.

The charge transport layer is electrically connected to the charge generation layer as is electrically connected to the charge generation layer as mentioned above. It receives charge carriers injected from the charge generation layer in the presence of an electrical field and also has the function of transporting these charge carriers to the surface. The charge transport layer may be laminated on the charge generation layer or it may also be laminated beneath the charge generation layer. However, the charge transport layer may desirably be laminated on the charge generation layer.

A photoconductive member has generally the function of transporting charge carriers, and therefore the charge transport layer can be formed of such a photoconductive member.

The material for transporting charge carriers in the charge transport layer (hereinafter referred merely as the charge transport material) may preferably be substantially insensitive to the wavelength region of electromagnetic wave to which the aforesaid charge generation layer is sensitive. The "electromagnetic wave" as herein mentioned is inclusive of the definition "light" in broader sense, including γ-rays, x-rays, UV-rays, visible light, near-infrared rays, infrared rays, far-infrared rays and the like. When the light-sensitive wavelength regions of the charge transport layer coincides with or overlaps that of the charge generation layer, the charge carriers generated in both layers will trap each other to give a cause for lowering sensitivity.

As the charge transport material, there are electron-transporting materials and hole-transporting materials. As the electron-transporting materials, there may be included electron-attracting substances such as chloranil, bromanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, and the like, and polymers comprising these electron-attracting substances.

As the hole-transporting substances, there may be included pyrene, N-ethylcarbazole, N-isopropylcarbazole, N-methyl-N-phenylhydrazino-3-methylidene-9-ethylcarbazole, N,N-diphenyl-hydrazino-3-methylidene-9-ethylcarbazole, N,N-diphenylhydrazino-3-methylidene-10-ethylphenothiazine, N,N-diphenylhydrazino-3-methylidene-10-ethylphenoxazine, hydrazones such as p-diethylaminobenzaldehyde-N,N-diphenylhydrazone, p-diethylaminobenzaldehyde-N-α-naphthyl-N-phenylhydrazone, p-pyrrolidino-benzaldehyde-N,N-diphenylhydrazone, 1,3,3-trimethylindolenine-ω-aldehyde-N,N-diphenylhydrazone, p-diethylbenzaldehyde-3-methylbenthiazolinone-2-hydrazone and the like, 2,5-bis(p-diethylaminophenyl)-1,3,4-oxadiazole, pyrazolines such as 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)pyrazoline, 1-[pyridyl(2)]-3-(p-diethylaminostyryl)-5-(p-diethylaminophenyl)pyrazoline, 1-[6-methoxypyridyl(2)]-3-(p-diethylaminostyryl)-5-(p-diethylaminophenyl)pyrazoline, 1-[pyridyl(3)]-3-(p-diethylaminostyryl)-5-(p-diethylaminophenyl)-pyrazoline, 1-[lepidyl(2)]-3-(p-diethylaminostyryl)-5-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-[pyridyl(2)]-3-(α-methyl-p-diethylaminostyryl)-5-(p-diethylaminophenyl) pyrazoline, 1-phenyl-3-(p-diethylaminostyryl)-4-methyl-5-(p-diethylaminophenyl)pyrazoline, 1-phenyl 3-(α-benzyl-p-diethylaminostyryl)-5-(p-diethylaminophenyl)pyrazoline, spiropyrazoline and the like, oxazole compounds such as 2-(p-diethylaminostyryl)-6-diethylaminobenzoxazole, 2-(p-diethylaminophenyl)-4-(p-dimethylaminophenyl)-5-(2-chlorophenyl)oxazole and the like, thiazole compounds such as 2-(p-diethylaminostyryl)-6-diethylaminobenzothiazole and the like, triarylemethane compounds such as bis(4-diethylamino-2-methylphenyl)phenylemthane and the like polyaryl alkanes such as 1,1-bis(4-N,N-diethylamino-2-methylphenyl)heptane, 1,1,2,2-tetrakis(4-N,N-dimethylamino-2-methylamino-2-methylphenyl)ethane and the like, triphenylamine, poly-N-vinylcarbazole, polyvinyl-pyrene, polyvinyl-anthracene, polyvinyl-acridine, poly-9-vinylphenyl-anthracene, pyrene-formaldehyde resin, ethylcarbazole-formaldehyde resin, and so on.

Other than these organic charge transporting materials, there may also be employed inorganic materials such as selenium, selenium-tellurium, amorphous silicon, cadmium sulfide, etc.

These charge transporting materials may be used either singly or as a combination or two or more kinds.

When the charge transporting materials has no film forming property, film can be formed by choosing an appropriate binder. The resin which can be used as the binder may include insulating resins such as acrylic resin, polyallylate, polyester, polycarbonate, polystyrene, acrylonitrile-styrene copolymer, acrylonitrile-butadiene copolymer polyvinylbutyral, polyvinyl formal, polysulfone, polyacrylamide, polyamide, chlorinated rubber, etc. or organic photoconductive polymers such as poly-N-vinylcarbazole, polyvinyl-anthracene, polyvinyl-pyrene, etc.

The charge transport layer, which is limited capacity of transporting charge carriers, cannot be made thicker in film thickness than is necessary.

Generally speaking, it is 5 to 30μ, preferably 8 to 20μ. In forming a charge transport layer by coating, there may be employed a suitable coating method selected from those described above.

The photosensitive layer comprising such a laminated structure of the charge generation layer and the charge transport layer is provided on substrate having an electroconductive layer. As the substrate having an electroconducitve layer, there may be employed those having themselves electroconductivity such as aluminum, aluminum alloys, copper, zinc, stainless steel, vanadium, molybdenum, chromiun, titanium, nickel, indium gold or platinum, or otherwise plastics (e g. polyethylene. polypropylene, polyvinyl chloride. polyethylene terephthalate, acrylic resin, polyethylene fluoride, etc.) having a layer formed by coating according to the vaccum deposition method of aluminum, aluminum alloys, indium oxide, tin oxide, indium oxide-tin oxide alloys, etc., substrates of plastics coated with electroconductive particle, (e.g. carbon black, silver particles, etc.) together with an appropriate binder, substrates of plastics or papers impregnated with electroconductive particles, plastics having electroconductive polymers, etc.

It is also possible to provide a subbing layer having the barrier function and the adhesive function between the electroconductive layer and the photosensitive layer. The subbing layer may be formed of casein, polyvinyl alcohol, nitro-cellulose, ethylene-acrylic acid copolymer, polyamide (nylon 6, nylon 66, copolymerized nylon, alkoxymethylated nylon, etc.), polyurethane, gelatin, aluminum oxide, etc.

The subbing layer may have a thickness of 0.1 to 5μ, preferably 0.3 to 3μ.

In the case of employing a photosensitive member in which an electroconductive layer, a charge generation layer and a charge transport layer are successively laminated, when the charge transporting material comprises an electron transporting material, the surface of the charge transport layer is required to be charged positively. When exposed after charging, the electrons generated in the charge generation layer at the exposed portion are injected into the charge transport layer and thereafter reach the surface to neutralize the positive charges, whereby the surface potential is decayed to give rise to an electrostatic contrast between the exposed portion and the unexposed portion. The electrostatic latent image thus formed can be developed with a negatively charged toner to give a visible image. This image can be fixed directly, or developed and fixed after transfer of the toner image onto a paper or plastic film.

Also, it is possible to employ the method in which the electrostatic latent image on the photosensitive member is transferred onto an insulating layer on a transfer paper, followed by developing and fixing. Any kind of developers, developing methods and fixing methods may be employed without any specific limination. On the other hand, when the charge transporting material comprises a hole-transporting material, the surface of the charge transport layer is required to be negatively charged. When exposed after charging, holes formed in the charge generation layer at the exposed portion are injected into the charge transport and thereafter reach the surface to neutralize the negative charges, whereby the surface potential is decayed to give rise to an electrostatic contrast between the exposed portion and the unexposed portion. During developing, it is necessary to use a positively chargeable toner, as opposite to the case of employing an electron transporting material.

As another application example, there may be mentioned an electrophotographic photosensitive member in which the photoconductive composition prepared according to the present invention is contained together with the charge transport material in the same layer. In this case, other than the charge transporting material as described above, a charge transfer complex compound comprising poly-N-vinyl-carbazole and trinitrofluorenone can be used.

The electrophotographic photosensitive member according to this example can be prepared by dispersing the organic photoconductive member and the charge transfer complex compound in a polyester solution dissolved in tetrahydrofuran, followed by formation of a coating with the dispersion.

Any of the photosensitive members contains at least one of the pigment compositions subjected to the above treatment, and may be enhanced in sensitivity in combination with a pigment of different light absorption, if desired, or two or more pigment compositions subjected to the above treatment may be employed for the purpose of obtaining a panchromatic photosensitive member, etc.

The electrophotographic photosensitive member thus prepared can be utilized not only for electophotographic copying machines, but also widely for the field of electrophotographic application such as laser printer, CRT printer, etc.

The photoconductive composition prepared according to the present invention is not limited to the electrophotographic photosensitive member as described above, but it can also be utilized for solar battery and photosensor.

The present invention is described below by referring to the following Examples.

EXAMPLE 1

Into a 500 ml beaker, 80 ml of water 16.6 ml (0.19 mole) of conc. HCl and 6.53 g (0.029 mole) of a diamine represented by the formula

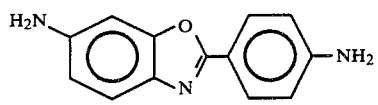

were charged and the liquid temperature was adjusted to 3° C. by stirring the mixture under cooling on an ice-water bath. Then, a solution of 4.2 g (0.061 mole) of sodium nitrite dissolved in 7 ml of water was added dropwise over 10 minutes while controlling the liquid temperature at 3° to 10° C. After completion of the addition, stirring was continued for additional 30 minutes at the same temperature. Carbon was added to the reaction mixture, followed by filtration, to obtain a tetrazotized liquid.

Subsequentlly, after 21 g (0.53 mole) of caustic soda was dissolved in 700 ml of water in a 2-liter beaker, 16.2 g (0.061 mole) of naphthol AS (3-hydroxy-2-naphthoic acid anilide) was added to the solution to be dissolved therein.

The coupler solution was cooled to 6° C. and the above tetrazotized liquid was added dropwise under stirring over 30 minutes while controlling the liquid temperature at 6° to 10° C., and thereafter the mixture was stirred at room temperature for 2 hours and further left to stand overnight. The reaction mixture was filtered and washed with water to obtain 19.08 g of a crude pigment. Then, washing each with 400 ml of N,N-dimethylforamide was repeated for 5 times. Then, washing each with 500 ml of MEK was repeated for 3 times to obtain 67.23 g of MEK paste of the purified pigment. The pigment solid in the MEK paste was 25%, with the yield being 75%. The pigment obtained has the following structure:

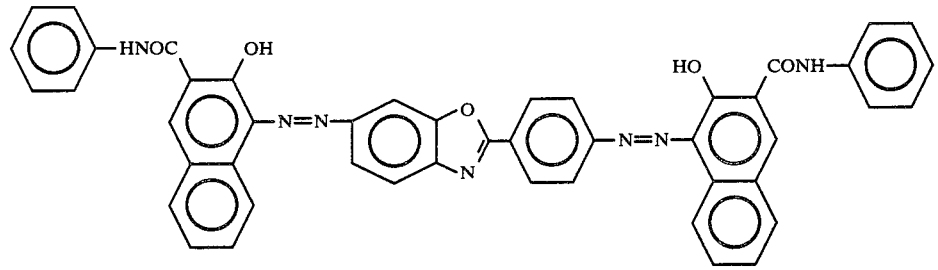

As the next step, the operation of washing 20 g of the above MEK paste of the purified pigment with 150 ml of pure water was repeated twice to obtain 19.3 g of water paste. The water paste was transferred into four eggplant-shape flasks so as to daub the inner walls of the flasks with the paste and the flasks were dipped in liquid nitrogen for pre-freezing, followed by freeze vacuum drying.

Freeze vacuum drying was conducted by means of Neocool freeze dryer DC-55A produced by Yamamoto Kagaku K. K. After freeze drying at a trap temperature of $-80°$ C., under a vacuum of 0.05 to 0.07 Torr for 12 hours, 4.95 of a bulky solid was obtained.

Next, 5 g. of the above dried pigment was added into a solution of 2 g of a butyral resin (degree of butyralization of 63 mole %) dissolved in 95 ml of MEK, and dispersed therein by an attritor for 2 hours.

Then, an aqueous ammoniacal solution of casein (casein 11.2 g, 1 g of 28% aqueous ammonia, water 222 ml)

was applied on an aluminum plate by a Meyer bar to form a film so as to be dried into 1.0 μ-thick film, followed by drying.

On the casein layer was applied by a Meyer bar the previously dispersed pigment dispersion to form a film so as to be dried into 0.5 μ-thick film, followed by drying, to form a charge generation layer.

Subsequently, 5 g of p-diethylaminobenzaldehyde-N,N-diphenylhydrazone and 5 g of a polymethyl methacrylate resin (number average molecular weight: 100,000) were dissolved in 70 ml of benzene, and the solution was applied by a Meyer bar on the charge generation layer to form a film so as to be dried into 12 μ-thick film, followed by drying, to form a charge transport layer.

On the other hand, for comparative purpose, by use of a powered pigment obtained by drying of the MEK paste of the above pigment by heating at 60° C. for 4 hours, Comparative sample 1 corresponding to Sample 1 was prepared.

The electrophotographic photosensitive members thus prepared were subjected to corona charging at −5 KV according to the static system by use of an electrostatic copying paper, a test device Model sp-428, produced by Kawaguchi Denki K. K., held in a dark place for one second and exposed under a illuminance of 5 lux for examination of charging characteristics.

As the charging characteristics, the surface potential ($V_D$) and the exposure quantity ($E_{\frac{1}{2}}$) for having the potential when subjected to dark decay for one second were measured. The results are shown in Table 1.

TABLE 1

|  | $V_D(-V)$ | $E_{\frac{1}{2}}$ (lux sec) |
|---|---|---|
| Sample 1 | 590 | 3.6 |
| Comparative Sample 1 | 580 | 8.4 |

Further, for measurement of the changes in the light portion potential and the dark portion potential when repeatedly used the photosensitive member prepared in this Example was plastered on the cylinder of an electrophotographic copying device equipped with an exposure optical system, a developing instrument, a transfer charger, a deelectrifying exposure optical system and a cleaner. The copying machine is constituted so as to give an image on the transfer paper with driving of the cylinder. With this copying machine, the light portion potential ($V_L$) and the dark portion potential ($V_D$) at the initial stage, and the light portion potential ($V_L$) and the dark portion potential ($V_D$) after used for 5000 times were measured. The results are shown in Table 2.

TABLE 2

|  | Initial stage | | After 5000 successive copying | |
|---|---|---|---|---|
|  | $V_D(-V)$ | $V_L(-V)$ | $V_D(-V)$ | $V_L(-V)$ |
| Sample 1 | 590 | 35 | 580 | 45 |
| Comparative sample 1 | 570 | 50 | 520 | 110 |

From the results shown in Table 1 and Table 2, it can be seen that the photosensitive member obtained according to the preparation method of the present invention is very excellent in sensitivity as well as in stability of $V_D$, $V_L$ during successive copying.

EXAMPLE 2

A mixture of 148 g of phthalic anhydride, 180 g of urea, 25 g of anhydrous cuprous chloride, 0.3 g of ammonium molybdate and 370 g of benzoic acid was allowed to react under stirring by heating at 190° C. for 2.5 hours. After completion of the reaction, benzoic acid was distilled under a reduced pressure, and the residual mixture was subjected successively to washing with water and filtration, washing with acid and filtration and washing with water and filtration, to obtain 130 g of a crude copper phthalocyanine.

The crude copper phthalocyanine was dissolved in 1300 g of conc. sulfuric acid, stirred at room temperature for 2 hours and thereafter poured into a large amount of ice-water. The pigment precipitated was separated by filtration and washed with water to neutralization.

After carrying out stirring and filtration for 6 times with 2.6 l of DMF, followed by stirring and filtration twice with 2.6 l of cyclohexane, 467 g of a cyclohexanone paste of purified copper phthalocyanine (solid: 27%, 126 g) was obtained.

Then, 20 g of the above cyclohexanone paste of purified pigment was applied by coating on inner walls of four 200 ml eggplant-shape flasks and after prefreezing by dipping in liquid nitrogen, freeze vacuum drying was conducted similarly as in Example 1. After freeze vacuum drying at a trap temperature of −80° C. under a vacuum of 0.02 to 0.06 Torr for 18 hours, 5.02 g of a bulky solid was obtained.

The above dried pigment was added into a solution of 2 g of a cellulose acetate butyrate resin in a solvent mixture of 95 ml of MEK and 15 ml of cyclohexanone and dispersed in a ball mill for 40 hours. On the PVA layer of an aluminum plate having a layer of polyvinyl alcohol (PVA) with a thickness of 1μ provided thereon, the above pigment dispersion was applied and dried similarly as in Example 1 to form a charge generation layer with a thickness of 0.2μ.

Then, a solution of 5 g of 1-(2-pyridyl)-3-p-diethylamino-styryl-5-p-diethylaminophenylpyrazoline and 5 g of poly-4,4'-dioxydiphenyl-2,2-propanecarbonate (molecular weight 30000) dissolved in 70 ml of THF was applied by Meyer bar on the charge generation layer and dried to form a charge transport layer of 10 g/m² (Sample No. 2).

On the other hand, by use of the powdery pigment obtained by vacuum drying by heating the cyclohexanone paste of the pigment used in Sample 2 at 120° C. for 6 hours, Comparative sample 2 corresponding to Sample 2 was prepared.

The charging characteristics and durability of the thus prepared electrophotographic photosensitive member were measured similarly as in Example 1 to obtain the results shown in Table 3 and Table 4 (except that the exposure quantity in the successive copying test was changed to 15 lux.sec).

TABLE 3

|  | $V_D(-V)$ | $E_{\frac{1}{2}}$ (lux · sec) |
|---|---|---|
| Sample 2 | 570 | 5.2 |
| Comparative sample 2 | 575 | 10.8 |

TABLE 4

| | Initial stage | | After 5000 successive copying | |
|---|---|---|---|---|
| | $V_D(-V)$ | $V_L(-V)$ | $V_D(-V)$ | $V_L(-V)$ |
| Sample 2 | 580 | 40 | 575 | 45 |
| Comparative Sample 2 | 585 | 65 | 530 | 120 |

From the results shown in Table 3 and Table 4, it can be seen that, similarly as in Example 1, the electrophotographic photosensitive member prepared by use the photoconductive composition according to the preparation method of the present invention has very excellent characteristics.

What is claimed is:

1. An electrophotographic photosensitive member, comprising a photosensitive layer comprising a photoconductive organic pigment or dye dried by the freeze vacuum drying method and a binder resin.

2. An electrophotographic photosensitive member comprising a photosensitive layer comprising a charge generation layer and a charge transport layer, said charge generation layer comprising a photoconductive organic pigment or dye dried by the freeze vacuum drying method and a binder resin.

3. An electrophotographic photosensitive member according to claim 1, wherein the degree of vacuum in said freeze vacuum drying method is 1 mm Hg or lower.

4. An electrophotographic photosensitive member according to claim 1, wherein the photoconductive organic pigment or dye before drying by the freeze vacuum drying method is in the state of a paste dispersed in the presence of water or an organic solvent.

5. An electrophotographic photosensitive member according to claim 1, wherein said organic pigment or dye is constituted of fine particles with particle sizes of $1\mu$ or less.

6. An electrophotographic photosensitive member according to claim 1, wherein said organic pigment or dye is constituted of fine particles with particle size of $0.5\mu$ or less.

7. An electrophotographic photosensitive member according to claim 1, wherein said organic pigment or dye is at least one selected from the group consisting of azo pigments, phthalocyanine pigments, quinacridone pigments, cyanine dyes, pyrylium dyes, thiapyrylium dyes, indigo pigments, squaric acid dyes and polycylic quinone pigments.

8. An electrophotographic photosensitive member according to claim 1, wherein said organic pigment is a disazo pigment.

9. An electrophotographic photosensitive member according to claim 1, wherein said organic pigment is copper phthalocyanine pigment.

10. An electrophotographic photosensitive member according to claim 2, wherein said charge generation layer has a film thickness of $5\mu$ or less.

11. An electrophotographic photosensitive member according to claim 2, wherein said charge generation layer has a film thickness of 0.01 to $1\mu$.

12. A method for preparing a photoconductive composition, which comprises drying an organic pigment or dye obtained by synthesis reaction according to freeze vacuum drying, and thereafter dispersing the organic pigment or dye in a binder or a film-forming material and forming into a film the pigment or dye.

13. A method for preparing a photoconductive composition according to claim 12, wherein the freeze vacuum drying is practiced for a mixture containing the organic pigment or dye obtained by synthesis reaction and water.

14. A method for preparing a photoconductive composition according to claim 12, wherein the freeze vacuum drying is practiced for a mixture containing the organic pigment or dye obtained by synthesis reaction and an organic solvent.

* * * * *